(12) United States Patent
Wen

(10) Patent No.: US 8,698,337 B2
(45) Date of Patent: Apr. 15, 2014

(54) MATRIX SEA WAVE POWER GENERATING DEVICE

(75) Inventor: Huian Wen, Guiyang (CN)

(73) Assignee: Guiyang Qianxing Technology Co., Ltd., Guiyang, Guizhou (CN)

( * ) Notice: Subject to any disclaimer, the term of this patent is extended or adjusted under 35 U.S.C. 154(b) by 85 days.

(21) Appl. No.: 13/575,300

(22) PCT Filed: Jan. 28, 2011

(86) PCT No.: PCT/CN2011/070747
§ 371 (c)(1),
(2), (4) Date: Jul. 26, 2012

(87) PCT Pub. No.: WO2011/091765
PCT Pub. Date: Aug. 4, 2011

(65) Prior Publication Data
US 2012/0306210 A1 Dec. 6, 2012

(30) Foreign Application Priority Data

Jan. 29, 2010 (CN) .......................... 2010 1 0102901

(51) Int. Cl.
*F03B 13/10* (2006.01)
(52) U.S. Cl.
USPC ............................................. 290/53; 290/42

(58) Field of Classification Search
USPC .......................................... 290/53, 42; 60/495
See application file for complete search history.

(56) References Cited

U.S. PATENT DOCUMENTS

| 4,539,484 A * | 9/1985 | Suggs .............................. 290/53 |
| 5,359,229 A * | 10/1994 | Youngblood .................... 290/53 |
| 2009/0322092 A1 * | 12/2009 | Werjefelt ......................... 290/53 |
| 2011/0304144 A1 * | 12/2011 | Dehlsen et al. ................. 290/53 |
| 2013/0038064 A1 * | 2/2013 | Azpiroz Villar ................ 290/53 |

* cited by examiner

*Primary Examiner* — Vanessa Girardi
(74) *Attorney, Agent, or Firm* — Raymond Y. Chan; David and Raymond Patent Firm

(57) ABSTRACT

A matrix sea wave power generating device includes a plurality of power generating units positioned to form a matrix, wherein each of the power generating units includes a floating member, a transmission shaft provided on the floating member, a ratchet having a plurality of ratchet teeth, a pull disk, a speed increasing device, a power generator, and a driving device, wherein the transmission shaft is rotatably mounted on the floating member through a shaft bearing, and is operatively connected to the power generator through the speed increasing device, the ratchet teeth is extended in a clockwise direction, wherein the ratchet is provided on the transmission shaft, wherein the pull disk has plurality of engaging teeth engaged with the ratchet teeth of the ratchet, wherein the pull disk has a plurality of pulling strings, wherein a winding direction of the pulling strings is opposite to that of the corresponding ratchet teeth.

9 Claims, 8 Drawing Sheets

MATRIX SEA WAVE POWER GENERATING DEVICE

BACKGROUND OF THE PRESENT INVENTION

1. Field of Invention

The present invention relates to an electrical generator, and more particularly to a power generating device which is capable of generating electricity by using energy stored in sea waves.

2. Description of Related Arts

Water constitutes approximately 70% of the entire Earth. Thus, the technology in utilizing energy stored in the sea has becomes a recent research topic all over the world. The sea contains huge amount renewable energy in the form of wave power. However, this form of renewable energy is very unstable and unpredictable. Moreover, collecting such unstable form of energy can be very slow as compared with collecting other form of energy.

Conventionally, there exist three types of wave power devices for capturing wave power and converting the wave power into electrical power. The first type is apparatuses for capturing wave energy through fluid compression. In this type of wave power devices, a predetermined container device is utilized for being immersed into sea water at a predetermined depth. The container device is communicated to the sea water so that a predetermined amount of sea water can flow into the container device. When waves are generated, the water level of the sea fluctuates and this makes the volume of air in the container device fluctuate as well and this essentially compresses the air stored in the container device. The compressed air is arranged to drive a power generator which convert the potential energy stored in the compressed air into electrical energy. This type of wave powers devices have been developed and used in China and Japan. The second type of wave power devices is that of a mechanical type. For this type of wave power devices, sea wave motions are used to drive relative movement of mechanical components for generating electrical energy. The third type of water power devices guides water to flow into contracted water pipelines and utilize the potential energy of the water to drive a turbine for generating electricity. For these types of wave power devices, a common disadvantage is that the conversion efficiency is fairly low. This is because sea waves have to be guided to through many mechanical and electrical components before the wave power can be captured and converted into electrical power. Moreover, since the wave power devices must be built near along the shoreline, the entire power generating structure will be very expensive. The question as to how to develop a wave power device which is capable of efficiently and effectively converting unstable and low-density wave power into electrical power has become a main topic.

SUMMARY OF THE PRESENT INVENTION

The invention is advantageous in that it provides a sea wave power generating device which is capable of overcoming the problem of inefficient energy conversion, and excessive difficulty in building sea wave power plants.

According to the present invention, the foregoing and other objects and advantages are attained by providing a matrix sea wave power generating device, comprising a plurality of power generating units positioned to form a matrix, wherein each of the power generating units comprises a floating member, a transmission shaft provided on the floating member, a plurality of ratchets each having a plurality of ratchet teeth, a pull disk, a speed increasing device, a power generator, and a pull disk reversal driving device, wherein the transmission shaft is rotatably mounted on the floating member through a shaft bearing, and is operatively connected to a main shaft of the power generator through the speed increasing device, the ratchet tooth of the two ratchets are extended in a same direction, wherein the ratchet is provided on the transmission shaft, wherein the pull disk is sleevedly positioned outside the ratchets and has a plurality of engaging teeth engaged with the ratchet teeth of the ratchet, wherein the pull disk has a pulling string, wherein a winding direction of each pulling string of each pull disk is opposite to a lean direction of the corresponding ratchet teeth inside, wherein each pull disk is provided with a corresponding pull disk reversal driving device, wherein each pull disk reversal driving device forces a bending moment on the corresponding pull disk in a same direction with a lean direction of the ratchet teeth of each corresponding ratchet, wherein the matrix sea wave power generating device further comprises a plurality of universal rollers, wherein the pulling strings extended from the power generating units are guided by the universal rollers to secure to a predetermined point, wherein for each of the power generating units, two of the pulling strings are longitudinally extended therefrom, while another two of the pulling strings are transversely extended from the corresponding power generating units, wherein the power generating units are kept at the predetermined distance in the sea, wherein the outermost power generating units are secured to a secure point by the pulling strings so as to allow the entire array of power generating units to be confined within a predetermined area in the sea.

The matrix sea wave power generating device comprises at least four of the power generating units arranged in a predetermined array, wherein each of the two adjacent power generating units is spaced apart at a predetermined distance.

The matrix sea wave power generating device further comprising a plurality of universal rollers provided on the power generating units respectively, wherein each of the universal rollers comprises a plurality of roller members each having an indention formed thereon to define an indention surface, wherein the indention surfaces of the roller members constitute a guiding channel of the corresponding universal roller so as to allow the corresponding pulling string to pass through the universal roller through the guiding channel.

Moreover, the pull disk reversal driving device comprises a resilient element, a sliding member, a threaded rod having a fixed end, a driving wheel, and a supporting member having an end portion connected to the fixed end of the threaded rod.

The resilient element is mounted in the supporting member at a position between the fixed end and the sliding member.

Each of the ratchets has a plurality of ratchet teeth formed thereon, wherein the ratchets are spacedly formed on two sides of the flywheel. The matrix sea wave power generating device further comprises a flywheel provided on the transmission shaft.

Furthermore, two pairs of ratchets each having a plurality of ratchet teeth are formed on two sides of the flywheel.

As compared to conventional arts, the invention step of the present invention is very good. The power generating units form an array for generating electricity by using wave energy. Each of the power generating units is equipped with pulling strings, ratchets and pull disks so that when there exists relative movement between the power generating units, tension is developed in the pulling strings and this tension is transferred to a power generator for being converted into electrical energy. When the power generating units are moving towards each other, the relative motion can also be converted into electricity energy by the power generator. The matrix sea wave power generating device further comprising a plurality of universal rollers provided on the power generating units respectively, wherein each of the universal rollers comprises a plurality of roller members each having an indention formed thereon to define an indention surface, wherein the indention surfaces of the roller members constitute a guiding channel of the corresponding universal roller so as to allow the corresponding pulling string to pass through the universal roller through the guiding channel. Moreover, the pull disk reversal driving device comprises a resilient element, a sliding member, a threaded rod having a fixed end, a driving wheel, and a supporting member having an end portion connected to the fixed end of the threaded rod.

DETAILED DESCRIPTION OF THE PREFERRED EMBODIMENT

The preferred embodiment of the present invention is elaborated below with reference to the accompanying drawings.

Figure 1:
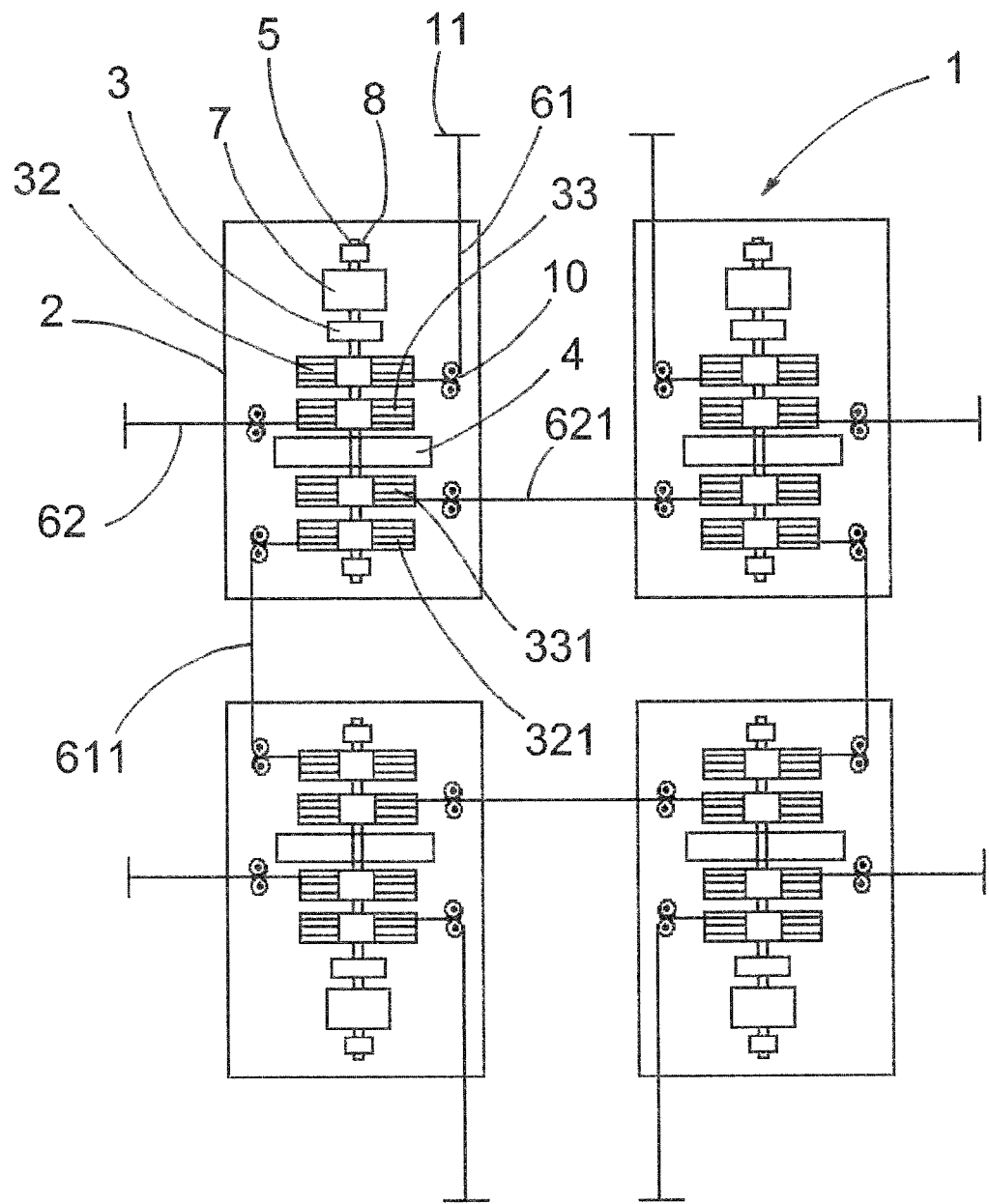
FIG. 1 is a schematic diagram of a matrix sea wave power generating device according to a preferred embodiment of the present invention.
Figure 2:
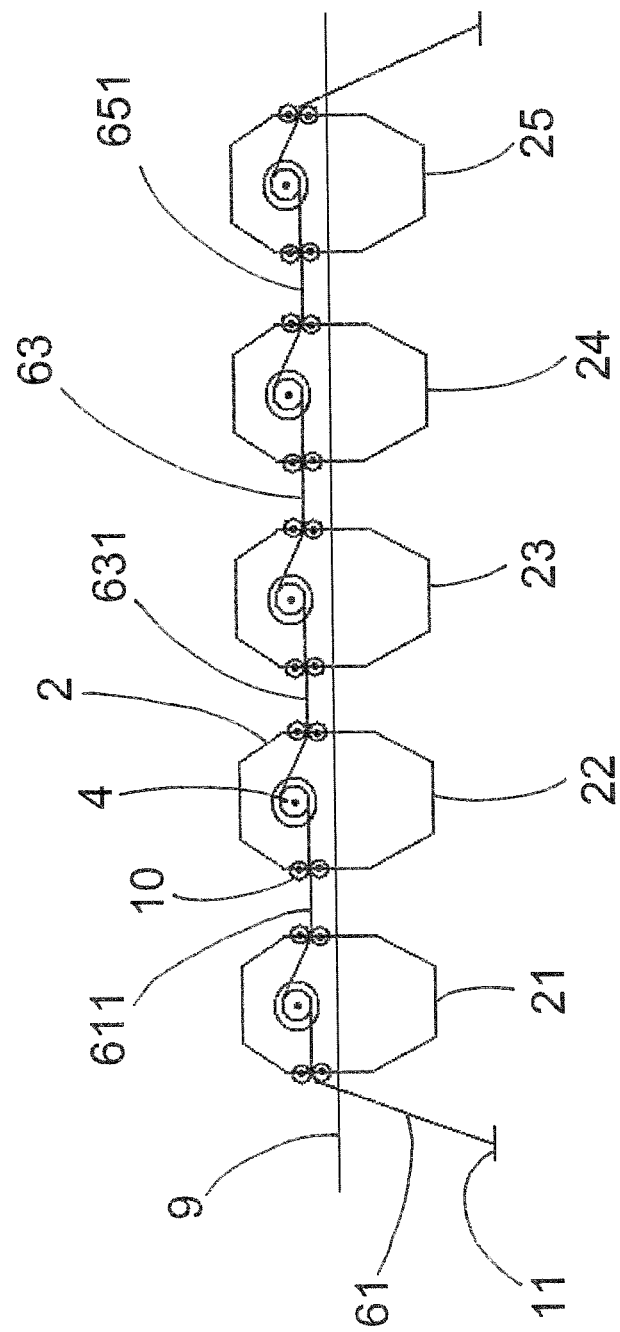
FIG. 2 is a side view of the matrix sea wave power generating device according to the above preferred embodiment of the present invention.
Figure 3:
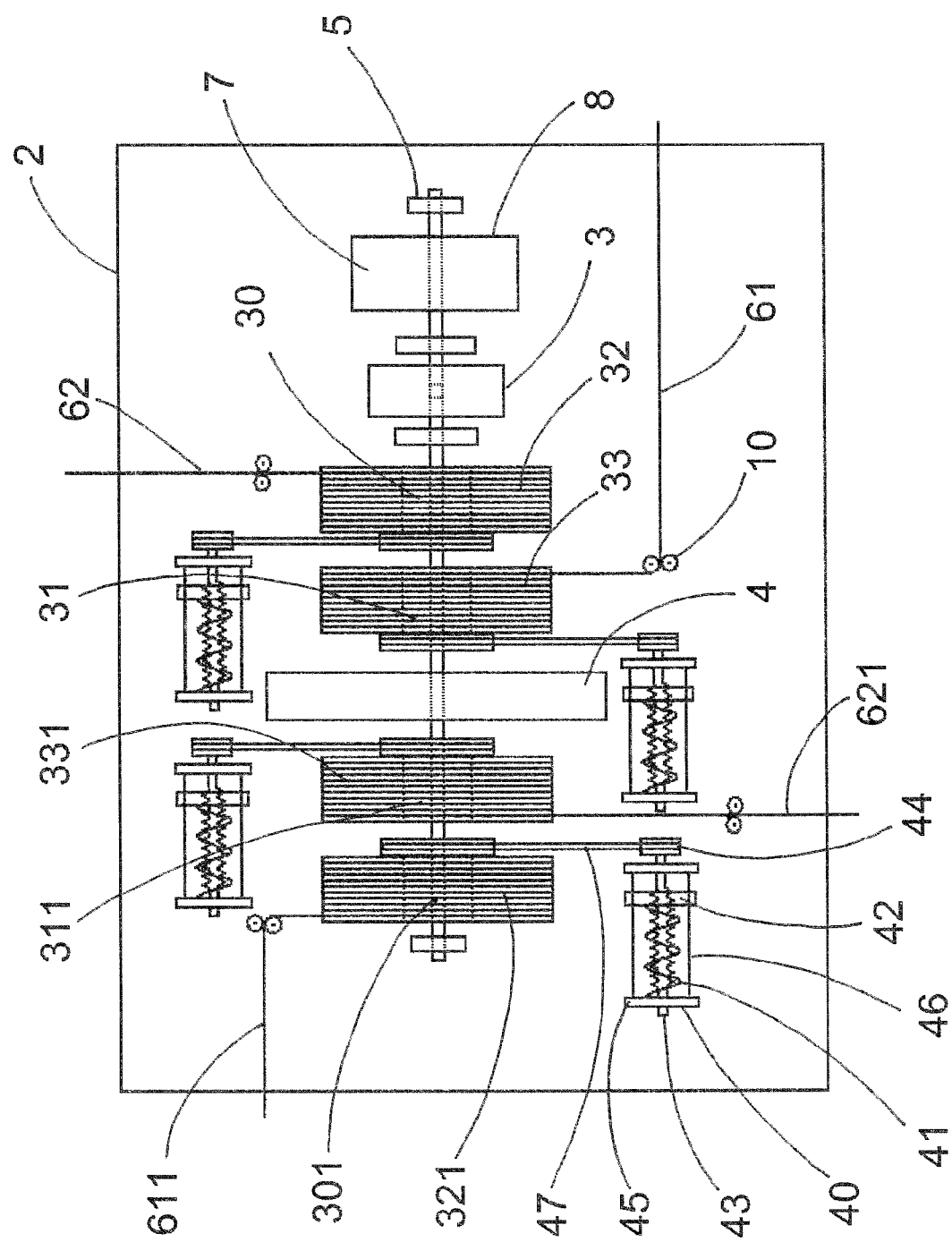
FIG. 3 is a schematic circuit diagram of the matrix sea wave power generating device according to the above preferred embodiment of the present invention.
Figure 4:
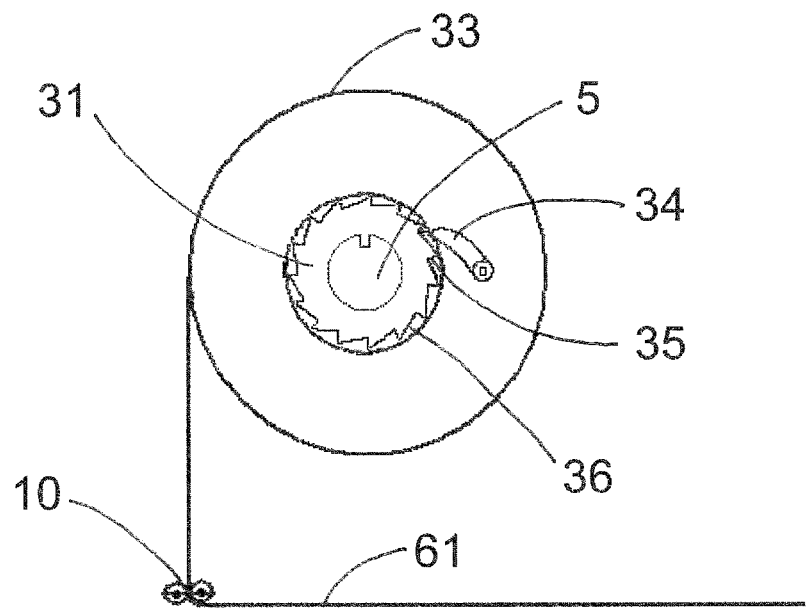
FIG. 4 is a schematic diagram of a power generating unit of the matrix sea wave power generating device according to the above preferred embodiment of the present invention, illustrating the relationship between the ratchets, the pull disks and the pulling strings.
Figure 5:
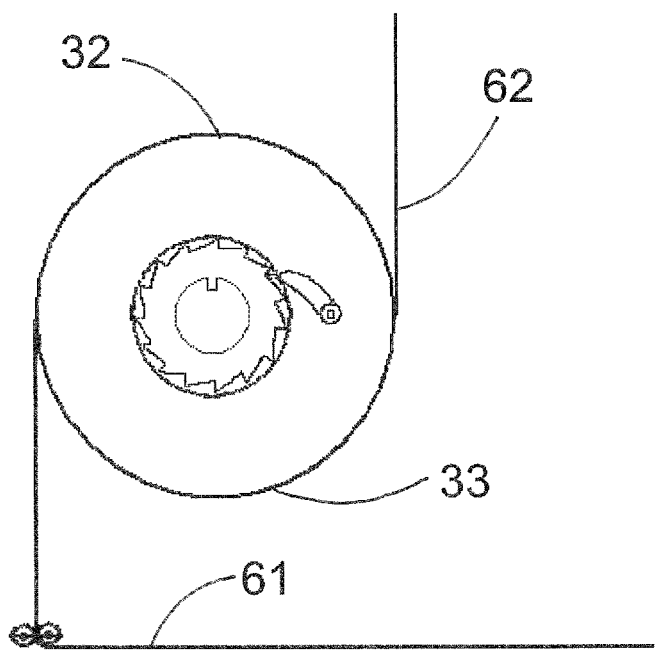
FIG. 5 is a schematic diagram of a pull disk of the matrix sea wave power generating device according to the above preferred embodiment of the present invention.

Referring to FIG. 1 to FIG. 10 of the drawings, the matrix sea wave power generating device according to a preferred embodiment of the present invention is illustrated, in which FIG. 1 is used to only illustrate the matrix structure of the present invention without the pull disk reversal driving device. The matrix sea wave power generating device comprises a plurality of power generating units electrically connected with at least one of another power generating unit, wherein the power generating units are preferably arranged to form a 2×2 matrix structure to form a matrix sea wave power generating device with 4 power generating units, wherein each two of the power generating units is spacedly apart at a predetermined distance to allow the relative motions between the power generating units. Each of the power generating units comprises a floating member 2, preferably with a boat shape, and a transmission shaft 5, a ratchets, a pull disk, a speed increasing device 3, a power generator 7, and a pull disk reversal driving device 40 provided on the floating member 2, wherein the transmission shaft 5 is rotatably mounted on the floating member 2 through a shaft bearing 8, and is operatively connected to the main shaft of the power generator 7 through the speed increasing device 3. Moreover, each of the power generating units further comprises flywheels 4 provided on the middle part of the transmission shaft 5 and two pairs of ratchets 30, 31, 301, 311 each having a plurality of ratchet teeth formed thereon, wherein each pair of the ratchets 30, 31, 301, 311 is spacedly formed on two sides of each flywheel 4. The ratchet teeth of the first pair of ratchets 30 and 31 and the second pair of ratchets 301 and 311 are leaned in the same direction and disposed on the transmission shaft 5 in the same direction. Furthermore, the ratchets 30, 31, 301, 311 are respectively sleeved with the pull disks 32, 33, 321, 331, wherein each of the pull disks 32, 33, 321, 331 has plurality of engaging teeth engaged with the ratchet teeth of the corresponding ratchet 30, 31, 301, 311. Referring to FIG. 4 of the drawings, the pull disk 33 has an engagement member 34 formed thereon, and is engaged with the ratchet teeth 35 of the corresponding ratchet 31, in such a manner that when the pull disk 33 and the ratchet 31 rotate in opposite direction with respect to each other, the engagement member 34 is arranged to engage with the corresponding ratchet teeth 35 so as to lock up a rotational movement of the ratchet 31. When the pull disk 33 and the ratchet 31 rotate in the same direction with respect to each other, the engagement member 34 is arranged to be lifted up by the corresponding lifting portion 36 of the corresponding ratchet teeth 35 so as to release the locking mechanism exerted on the pull disk 33 for allow it to rotate freely. Similarly, each of the pull disks 32, 33, 321, 331 further has a pulling string 62, 61, 611, 621, wherein a winding direction of the pulling string 62, 61, 611, 621 is opposite to the direction of the corresponding ratchet teeth 35. As shown in FIG. 4 of the drawings, the ratchet teeth is extended in a clockwise direction, while the winding direction of the pulling strings 61, 62, 611, 621 is in anti-clockwise direction. It is worth mentioning that the pulling strings 61, 62, 611, 621 are evenly and spacedly distributed along two sides of the transmission shaft 5 so as to ensure the stability of the transmission shaft 5 when it is subject to the pulling force exerted by the pulling strings 61, 62, 611, 621.

Referring to FIG. 2 of the drawings, when the sea has little waves, the power generating units 21, 22, 23, 24, 25 are kept at the predetermined distance in the sea. It is worth mentioning that the outermost power generating units 21, 25 are secured to point 11 by pulling strings 61, 65 so as to allow the entire array of power generating units to be confined within a predetermined area in the sea.

The matrix sea wave power generating device further comprises a plurality of universal rollers 10, wherein strings extended from the power generating units are guided by the universal rollers 10 to secure to a predetermined point. More specifically, for each of the power generating units, two of the pulling strings 61, 611 are longitudinally extended therefrom, while another two of the pulling strings 62, 621 are transversely extended from the corresponding power generating units.

Figure 6:
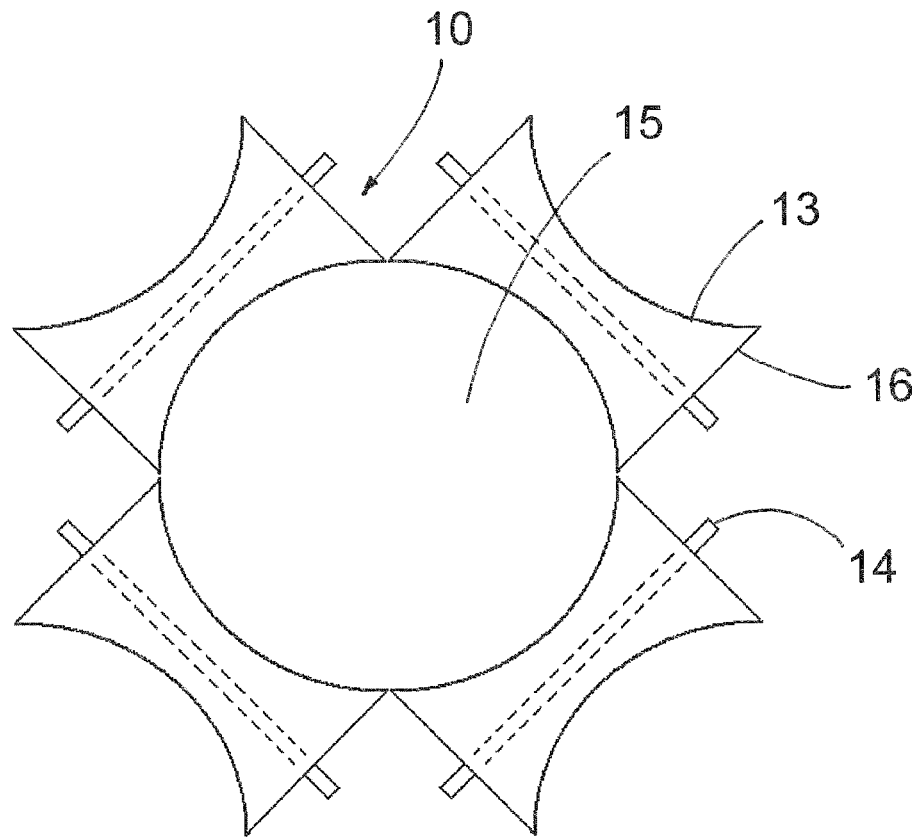
FIG. 6 is a schematic diagram of a universal roller of the matrix sea wave power generating device according to the above preferred embodiment of the present invention.
Figure 7:
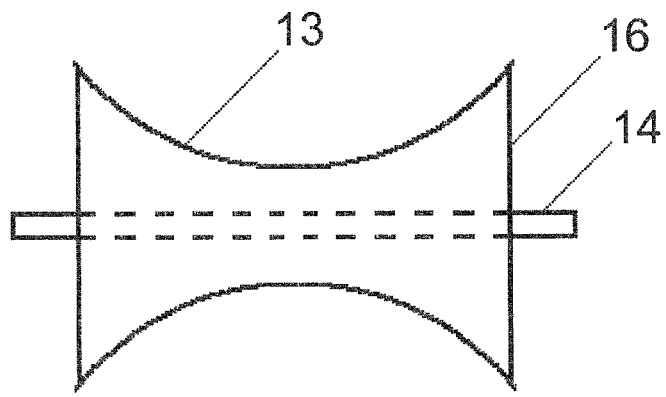
FIG. 7 is a schematic diagram of a rolling member of the universal roller of the matrix sea wave power generating device according to the above preferred embodiment of the present invention.

Referring to FIG. 6 of the drawings, each of the universal rollers 10 comprises a plurality of roller members 16, preferably 4 roller members 16, each having an indention formed thereon to define an indention surface 13, wherein the indention surfaces 136 of the roller members 16 constitute a guiding channel 15 of the corresponding universal roller 10 so as to allow the corresponding pulling string to pass through the universal roller 10 through the guiding channel 15. As a result, when any one of the power generating units is moved by the wave motions, the corresponding motions are to transferred to the corresponding pulling string for driving the power generator 7 for generating electricity. The structure of each of the roller members 16 is shown in FIG. 7.

Figure 8:
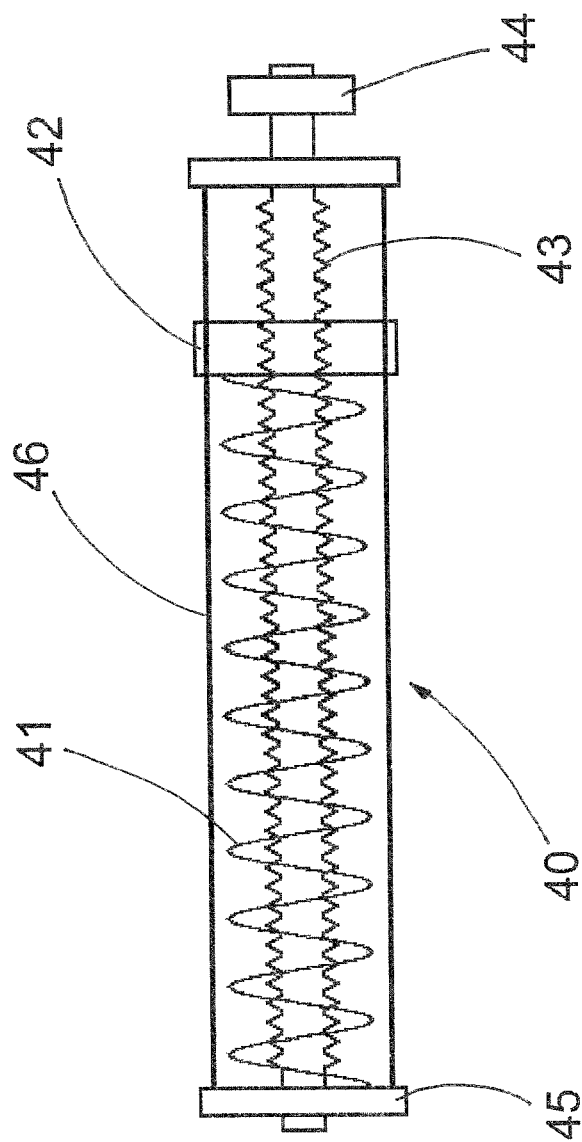
FIG. 8 is a schematic diagram of a pull disk reversal driving device of the matrix sea wave power generating device according to the above preferred embodiment of the present invention.

Referring to FIG. 8 of the drawings, the pull disk reversal driving device 40 comprises a resilient element 41, a sliding member 42, a threaded rod 43 having a fixed end 45, a driving wheel 44, and a supporting member 46 having an end portion connected to the fixed end 45 of the threaded rod 43. Moreover, the resilient element 41 is mounted in the supporting member 46 at a position between the fixed end 45 and the sliding member 42. The driving wheel 44 is connected to a corresponding pull disk 321 through a transmission cable 47. Each of the pull disks 32, 33, 321, 331 is connected to the corresponding driving wheel 44.

Referring to FIG. 3 of the drawings, when the pulling string 611 is tightened, the pulling string 611 is arranged to drive the corresponding pull disk 321 to rotate, and the threaded rod 43 of the pull disk reversal driving driving device 40 is driven to rotate as well through the transmission cable 47. When the threaded rod 43 is driven to rotate, the sliding member 42 is driven to move longitudinally along the supporting member 46 for compressing the resilient element 41. When the pulling string 611 is loosened, the resilient element 41 is arranged to exert an extension force to move the sliding member 42, which drives the threaded rod 43 to rotate. When the threaded rod 43 is driven to rotate, the rotation drives the driving wheel 44 to rotate which drive the pull disk 321 through the transmission cable 47. The loosened pulling string 611 is then re-tightened again by the rotation of the pull disk 321. Since the resilient element 41 has a predetermined elasticity, it is capable of optimally adjust the predetermined tension of the pulling string 611 in the manner described above.

Figure 9:
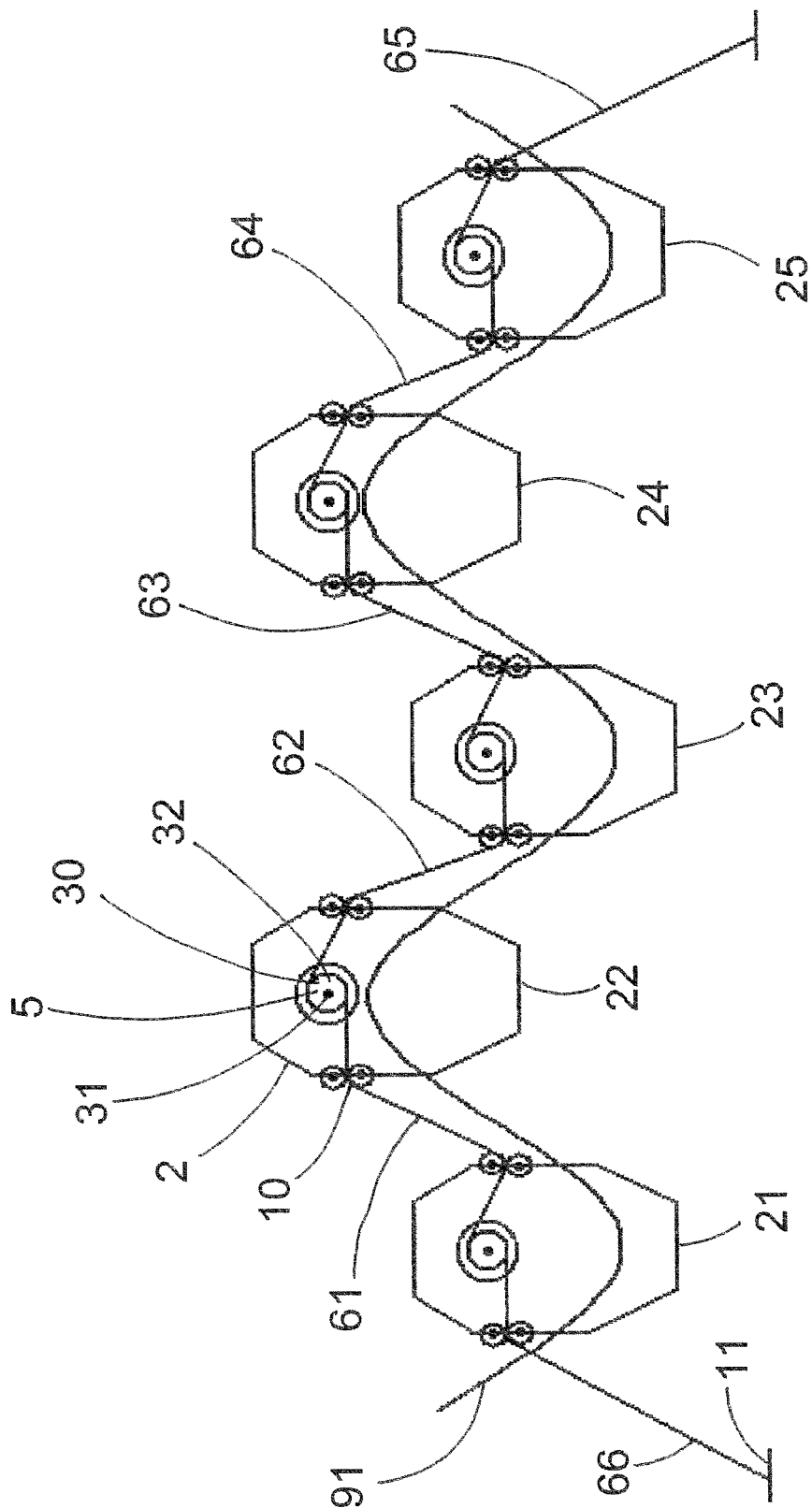
FIG. 9 is a schematic diagram of a matrix sea wave power generating device according to the above preferred embodiment of the present invention, illustrating that the matrix sea wave power generating device is subject to transverse oscillations.

Referring to FIG. 9 of the drawings, when the waves are transversely formed, the power generating units 21, 22, 23, 24, 25 are driven to move vertically on the water surface and form relative movement between these power generating units 21, 22, 23, 24, 25. When two of the power generating units 22, 24 are moving upwardly, and the other three power generating units 21, 23, 25 are moving downwardly, the relative distance between the corresponding power generating units 21, 22, 23, 24, 25 increases. In this situation, the power generating units 21, 22, 23, 24, 25 are pulled by the corresponding pulling strings 61, 611, 631, 63, 651, 65, the corresponding ratchets 30, 31 and the corresponding pull disks 32, 33. More specifically, the pulling strings 61, 611, 631, 63, 651, 65 are tightened by the reaction force generated by the wave movement, and the tension is transferred to the pull disks 32, 33. Since the transmission shaft 5 is connected to the ratchets 30, 31, the corresponding engagement member 34 is engage with the corresponding ratchet teeth 35 so as to lock up the corresponding ratchet 31. Moreover, the pull disks 32, 33 are arranged to drive the ratchets 30, 31 so that the transmission shaft 5 and the driving wheel 44 are driven to rotate. This also drives the threaded rod 43 to rotate as well so as to drive the sliding member 42 to move longitudinally to compress the supporting member 46. At the same time, the tension in the pulling strings 61, 611, 631, 63, 651, 65 is transferred to the flywheel 4 and the speed increasing device 3, the flywheel 4 is then driven to rotate so as to convert the tension into kinetic energy, while the speed increasing device 3 is arranged to adjust the rotating speed of the flywheel 4 to a predetermined value. The rotational movement is then transferred to the power generator 7 which converts the mechanical energy into electrical energy.

When the power generating devices 22, 24 are moving downwardly and the power generating devices 21, 23, 25 are moving upwardly, the relative distance between the corresponding power generating units 21, 22, 23, 24, 25 decreases. The corresponding pulling strings 61, 611, 631, 63, 651, 65 are loosened, and the resilient element 41 extends to move the sliding member 42 to drive the threaded rod 43 and the driving wheel 44 to rotate. The rotation of the driving wheel 44 drives the pull disk 321 through the transmission cable 47. The engagement member 34 is arranged to be lifted up by the corresponding lifting portion 36 of the corresponding ratchet teeth 35 so as to release the locking mechanism exerted on the pull disk 33 for allow it to rotate freely. The loosened pulling string 61, 611, 631, 63, 651, 65 are then re-tightened again by the rotation of the corresponding pull disk 321 and rewound by the corresponding pull disks 32, 33. At the same time, the flywheel 4 releases the kinetic energy stored therein to the transmission shaft 5 while the speed increasing device 3 is arranged to adjust the rotating speed of the flywheel 4 to a predetermined value. The rotational movement is then transferred to the power generator 7 which converts the mechanical energy into electrical energy. This ensures that the power output of the matrix sea wave power generating device is largely stable.

Figure 10:
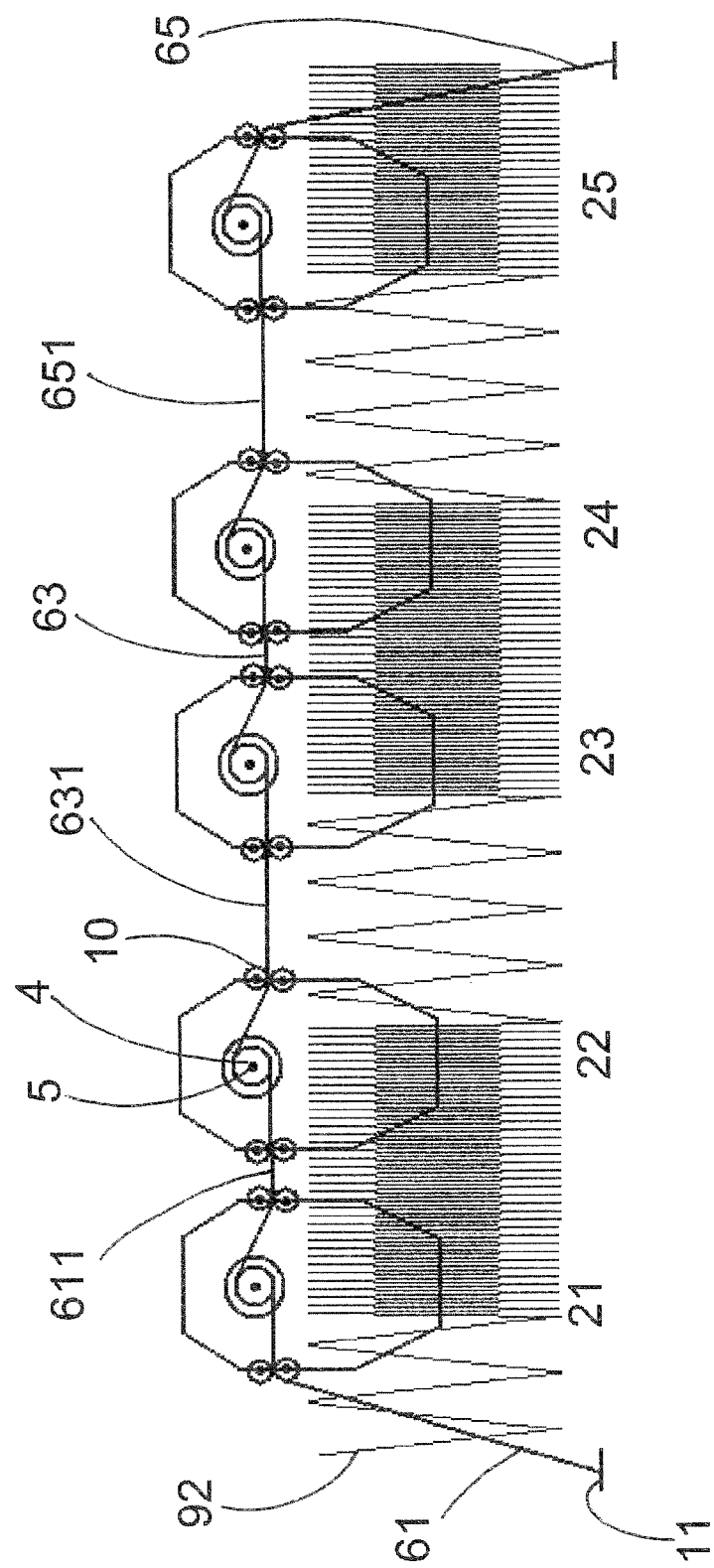
FIG. 10 is a schematic diagram of a matrix sea wave power generating device according to the above preferred embodiment of the present invention, illustrating that the matrix sea wave power generating device is subject to longitudinal oscillations.

Referring to FIG. 10 of the drawings, when the waves are transversely formed, the power generating units 21, 22, 23, 24, 25 are driven to move horizontally on the water surface and form relative movement between these power generating units 21, 22, 23, 24, 25. When two of the power generating units 22, 24 are moving away from the other three power generating units 21, 23, 25, the relative distance between the corresponding power generating units 21, 22, 23, 24, 25 increases. In this situation, the power generating units 21, 22, 23, 24, 25 are pulled by the corresponding pulling strings 61, 611, 631, 63, 651, 65, the corresponding ratchets 30, 31 and the corresponding pull disks 32, 33. More specifically, the pulling strings 61, 611, 631, 63, 651, 65 are tightened by the reaction force generated by the wave movement, and the tension is transferred to the pull disks 32, 33. Since the transmission shaft 5 is connected to the ratchets 30, 31, the corresponding engagement member 34 is engage with the corresponding ratchet teeth 35 so as to lock up the corresponding ratchet 31. Moreover, the pull disks 32, 33 are arranged to drive the ratchets 30, 31 so that the transmission shaft 5 and the driving wheel 44 are driven to rotate. This also drives the threaded rod 43 to rotate as well so as to drive the sliding member 42 to move longitudinally to compress the supporting member 46. At the same time, the tension in the pulling strings 61, 611, 631, 63, 651, 65 is transferred to the flywheel 4 and the speed increasing device 3, the flywheel 4 is then driven to rotate so as to convert the tension into kinetic energy, while the speed increasing device 3 is arranged to adjust the rotating speed of the flywheel 4 to a predetermined value. The rotational movement is then transferred to the power generator 7 which converts the mechanical energy into electrical energy. When the power generating devices 22, 23 are moving apart from each other and the power generating devices 24, 25 are moving towards each other, the relative distance between the corresponding power generating units 21, 22, 23, 24, decreases. The corresponding pulling strings 61, 611, 631, 63, 651, 65 are loosened, and the resilient element 41 extends to move the sliding member 42 to drive the threaded rod 43 and the driving wheel 44 to rotate. The rotation of the driving wheel 44 drives the pull disk 321 through the transmission cable 47. The engagement member 34 is arranged to be lifted up by the corresponding lifting portion 36 of the corresponding ratchet teeth 35 so as to release the locking mechanism exerted on the pull disk 33 for allow it to rotate freely. The loosened pulling string 61, 611, 631, 63, 651, 65 are then re-tightened again by the rotation of the corresponding pull disk 321 and rewound by the corresponding pull disks 32, 33. This ensures that the power generating units 21, 22, 23, 24, 25 return to their respective original or equilibrium position. At the same time, the flywheel 4 releases the kinetic energy stored therein to the transmission shaft 5 while the speed increasing device 3 is arranged to adjust the rotating speed of the flywheel 4 to a predetermined value. The rotational movement is then transferred to the power generator 7 which converts the mechanical energy into electrical energy. This ensures that the power output of the matrix sea wave power generating device is largely stable.

When two of the power generating units 22, 24 move away from the other two power generating units 23, 25 and move towards the other two power generating units 21, 23, the pulling strings 61, 611, 631, 63, 651, 65 are tightened by the reaction force generated by the wave movement, and the tension is transferred to the pull disks 32, 33. Since the transmission shaft 5 is connected to the ratchets 30, 31, the corresponding engagement member 34 is engage with the corresponding ratchet teeth 35 so as to lock up the corresponding ratchet 31. Moreover, the pull disks 32, 33 are arranged to drive the ratchets 30, 31 so that the transmission shaft 5 and the driving wheel 44 are driven to rotate. This also drives the threaded rod 43 to rotate as well so as to drive the sliding member 42 to move longitudinally to compress the supporting member 46. At the same time, the tension in the pulling strings 61, 611, 631, 63, 651, 65 is transferred to the flywheel 4 and the speed increasing device 3, the flywheel 4 is then driven to rotate so as to convert the tension into kinetic energy, while the speed increasing device 3 is arranged to adjust the rotating speed of the flywheel 4 to a predetermined value. The rotational movement is then transferred to the power generator 7 which converts the mechanical energy into electrical energy. When the distance between four of the power generators 21, 22, 23, 24 increases, the distance between another four of the power generators 22, to 23, 24, 25 decreases, the corresponding pulling strings 61, 611, 631, 63, 651, 65 are loosened, and the resilient element 41 extends to move the sliding member 42 to drive the threaded rod 43 and the driving wheel 44 to rotate. The rotation of the driving wheel 44 drives the pull disk 321 through the transmission cable 47. The engagement member 34 is arranged to be lifted up by the corresponding lifting portion 36 of the corresponding ratchet teeth 35 so as to release the locking mechanism exerted on the pull disk 33 for allow it to rotate freely. The loosened pulling string 61, 611, 631, 63, 651, 65 are then re-tightened again by the rotation of the corresponding pull disk 321 and rewound by the corresponding pull disks 32, 33. This ensures that the power generating units 21, 22, 23, 24, 25 return to their respective original or equilibrium position. At the same time, the flywheel 4 releases the kinetic energy stored therein to the transmission shaft 5 while the speed increasing device 3 is arranged to adjust the rotating speed of the flywheel 4 to a predetermined value. The rotational movement is then transferred to the power generator 7 which converts the mechanical energy into electrical energy. This ensures that the power output of the matrix sea wave power generating device is largely stable.

It is worth mentioning that the electricity generated by the power generating units is then transmitted to the main electricity network on the land, so that the present invention can utilize waves for effectively generating electricity.

Apart from the above mentioned preferred embodiment, the number of power generating units can be varied so as to fit different circumstances. The minimum number of the power generating unit is one, while a plurality of power generating units can also form a n×m matrix, wherein each of m and n is equal to or greater 1. When m is equal to n, the matrix is a square matrix. Moreover, the floating member can be of any shape. The universal roller can comprises one or more of the roller members. Moreover, the number of ratchets and flywheel can also be varied for each of the power generating units for optimizing the efficiency of the present invention. The resilient element may be attached on the supporting member instead of the threaded rod. The resilient element is preferably embodied as a compressive spring. It can also be embodied as a tension spring.

What is claimed is:

1. A matrix sea wave power generating device, comprising a plurality of power generating units positioned to form a matrix, wherein each of the power generating units comprises a floating member, a transmission shaft provided on the floating member, a plurality of ratchets each having a plurality of ratchet teeth, a plurality of pull disks, a speed increasing device, a power generator, and a plurality of pull disk reversal driving devices, wherein the transmission shaft is rotatably mounted on the floating member through a shaft bearing, and is operatively connected to the power generator through the speed increasing device, wherein two of the ratchets are coupled side by side on the transmission shaft and have the tooth extended along the transmission shaft in a same direction, wherein each of the ratchets is sleeved with one of the pull disks, wherein each of the pull disks has plurality of engaging teeth engaged with the ratchet teeth of each the corresponding ratchet, wherein the pull disk has a pulling string, wherein a winding direction of the pulling string of each the pull disk is opposite to a lean direction of the ratchet teeth of each the corresponding ratchet, wherein each the pull disk is provided with the corresponding pull disk reversal driving devices, wherein each the pull disk reversal driving device forces a bending moment on the corresponding null disk in a same direction with a lean direction of the ratchet teeth of each the corresponding ratchet, wherein said matrix sea wave power generating device further comprises a plurality of universal rollers, wherein said pulling strings extended from said power generating units are guided by the universal rollers to secure to a predetermined point, wherein for each of said power generating units, two of said pulling strings are longitudinally extended along the transmission shaft, while another two of the pulling strings are transversely extended from the transmission shaft, wherein the adjacent power generating units in the same line are connected with each other with the pulling strings longitudinally extended from the transmission shaft, while the adjacent power generating units in the same row are connected with each other with the pulling strings transversely extended along the transmission shaft, wherein the outermost power generating units arranged in line are secured to a secure point by said pulling strings with the pulling strings longitudinally extended from the transmission shaft and the outermost power generating units arranged in row are secured to a secure point by the pulling strings with the pulling strings transversely extended from the transmission shaft so as to allow the entire array of power generating units to be confined within a predetermined area in the sea.

2. The matrix sea wave power generating device, as recited in claim 1, comprising at least four of said power generating units arranged in a predetermined array, wherein each of said two adjacent power generating units is spaced apart at a predetermined distance.

3. The matrix sea wave power generating device, as recited in claim 1, further comprising a plurality of universal rollers provided on said power generating units respectively, wherein each of said universal rollers comprises a plurality of roller members each having an indention formed thereon to define an indention surface, wherein said indention surfaces of said roller members constitute a guiding channel of said corresponding universal roller so as to allow said corresponding pulling string to pass through said universal roller through said guiding channel.

4. The matrix sea wave power generating device, as recited in claim 1, wherein said pull disk reversal driving device comprises a resilient element, a sliding member, a threaded rod having a fixed end, a driving wheel, a supporting member having an end portion connected to said fixed end of said threaded rod, and a transmission cable.

5. The matrix sea wave power generating device, as recited in claim 4, wherein said resilient element further has a through-hole, and the threaded rod or the supporting member passes through the through-hole to limit the resilient element at a position between said fixed end of said thread rod and said sliding member.

6. The matrix sea wave power generating device, as recited in claim 4, wherein said pull disk reversal driving devices are respectively and operatively communicated to said corresponding pull disks through said corresponding transmission cables.

7. The matrix sea wave power generating device, as recited in claim 4, wherein the pulling strings of the pull disks sleeved outside two of the pair of ratchets are respectively fixed on the two sides of the transmission rod.

8. The matrix sea wave power generating device, as recited in claim 4, further comprising a flywheel provided on said transmission shaft.

9. The matrix sea wave power generating device, as recited in claim 8, wherein a pair of ratchets and pull disks with pulling strings are disposed on each side of the flywheel and the ratchet teeth of the ratchets are disposed on both two sides of the flywheel lean in the same direction.

* * * * *